United States Patent
Sinha et al.

(12)

(10) Patent No.: US 6,800,271 B2
(45) Date of Patent: Oct. 5, 2004

(54) PROCESS FOR THE PREPARATION OF NANOSIZED IRON OXIDE BY BIOMIMETIC ROUTE

(75) Inventors: Arvind Sinha, Jamshedpur (IN); Jui Chakraborty, Jamshedpur (IN); Samar Das, Jamshedpur (IN); Swapan K. Das, Jamshedpur (IN); Venkatesh Rao, Jamshedpur (IN); Patcha R. Rao, Jamshedpur (IN)

(73) Assignee: Council of Scientific and Industrial Research, New Delhi (IN)

( * ) Notice: Subject to any disclaimer, the term of this patent is extended or adjusted under 35 U.S.C. 154(b) by 274 days.

(21) Appl. No.: 10/112,044

(22) Filed: Apr. 1, 2002

(65) Prior Publication Data

US 2003/0185748 A1 Oct. 2, 2003

(51) Int. Cl.⁷ .............................................. C01G 49/00
(52) U.S. Cl. ...................................................... 423/632
(58) Field of Search ................................ 423/632, 633, 423/634

(56) References Cited

U.S. PATENT DOCUMENTS 5,269,843 A * 12/1993 Kunstmann et al. ........ 106/459
5,349,957 A * 9/1994 Yudelson .................... 600/414

FOREIGN PATENT DOCUMENTS

EP          0600529 A2     6/1994

OTHER PUBLICATIONS

Khomutov et al. Thermodeformation Properties and Structure of Polyvinylacohol Films Containing Boron Derivatives, Database Inspec 'Oline' Institute of Electrical Engineers. Stevenage, GB: Database Accession No. 2068885, XP 002220193, 1983, no month.

Pardoe et al. "Structural and Magnetic Properties of Nanoscale Iron Oxide Particles Synthesized n the Presence of Dextran or Polyvinyl Alcohol". Journal of Magnetism and Magnetic Materials. Elsevier Science Publishers, Amsterdam, NL. vol. 225, No. 1–2, 2001, pp. 41–46, XP004234921.

* cited by examiner

*Primary Examiner*—Steven Bos
(74) *Attorney, Agent, or Firm*—Nixon & Vanderhye P.C.

(57) ABSTRACT

The present invention relates to a biomimetic process for preparation of nanosized magnetite particles used for the enhancement of magnetic resonance imaging contrast.

6 Claims, No Drawings

PROCESS FOR THE PREPARATION OF NANOSIZED IRON OXIDE BY BIOMIMETIC ROUTE

FIELD OF THE INVENTION

The present invention relates to a process for the preparation of nanosized iron oxide by biomimetic route. The present invention particularly relates to a biomimetic process for preparation of nanosized magnetite particles used for the enhancement of magnetic resonance imaging contrast. The nanosized magnetite, a form of iron oxide, is biodegradable, nontoxic and has size in the range of 4–20 nanometer. The particles, being super-paramagnetic in nature and exhibiting a narrow size distribution, arte useful generally in the fields of medical treatment and specifically of Magnetic Resonance Imaging.

BACKGROUND OF THE INVENTION

Magnetic resonance imaging (MRI) is widely used for diagnostic imaging of the soft tissues and has been proven to be better to computed tomography for the detection of lever metastases. The screening and follow up of any kind of metastasis using contrast-enhanced MRI is an interesting tool for oncologists because ultrasound (US) is operator dependent and not always reproducible. Therefore, various contrast agents for an improved MR imaging have been developed by the pharmaceutical companies to serve the purpose.

Several metal chelates comprising of a highly magnetic cation $Gd^{3+}$ such as Gd-DTPA (Diethylene Triamine Pentaacetic Acid) are available for ready clinical use. These agents have been applied in enhancing the image contrast either as coating material in a therapeutic device or as directed agents for a specific organ. The only commercially available iron oxide for use in MRI contrast is ferumoxide, which has a supraparamagnetic crystalline core (nanosized magnetite) surrounded by dextra-coating. Being produced by conventional chemical method these magnetite particles suffer the limitations of the chemical synthesis route such as poor control over size and morphology. Thus, the suprapara-magnetic behaviour of the particles ultimately deteriorates and makes them unsuitable for applications.

In a conventional method of production of nanosized magnetite particles developed by David and Welch. (I. David and A. J. E. Welch, Trans. Faraday Soc. 52 (1956) 1642) ferrous sulphate solution is heated to 90° C. and a solution of potassium hydroxide and potassium nitrate added drop-wise over a few minutes. The suspension was heated for 60 minutes with continuous stirring followed by cooling, washing and drying leading to the formation of black precipitate of magnetite powder. It is mandatory to carry out the entire under an atmosphere of nitrogen.

In another known process by Schikorr (G. Schikorr, Z. Electrochem 35 (1929) 65) alkaline hydrolysis of ferrous sulphate solution is carried out to yield ferrous hydroxide followed by it's further oxidation at 100° C. leading to the formation of magnetite powder along with evolution of hydrogen gas.

In another known process, reaction of ferrous/ferric solution under alkaline condition at 80° C. under nitrogen atmosphere leads to the formation of magnetite particles (Regazzoni A. E., Urrutia G. A., Blesa M. A. and Maroto A. J. G., Inorg. Nucl. Chem, 43 (1981) 1489).

In hitherto known processes the magnetite particles produced have poor crystallinity, a wide range of size distribution, random variation in morphology and magnetically induced agglomeration. The above limitations reduce the applicability of the magnetite particles in the field of medicine.

OBJECTS OF THE INVENTION

The main object of the invention is to provide a process for preparation of nanosized iron oxide by biomimetic route, which obviates the drawbacks as detailed above.

Another object of the invention is to provide a biomimetic process for preparation of nanosized magnetic particles used for enhancement of magnetic resonance imaging contrast.

SUMMARY OF THE INVENTION

Accordingly, the present invention provides a process for preparation of nanosized iron oxide by biomimetic route which comprises i). mixing polyvinyl alcohol of strength ranging between 0.1–0.6% and disodium tetraborate solution of strength ranging between 0.1–0.6% in deionised water with continuous stirring ii). mixing the above said reaction mixture with an iron salt solution of strength ranging between 0.01–0.02 M in deionised water under nitrogen atmosphere, at a pH in the range of 3–6 and stirring for about 20 minutes with a magnetic stirrer iii). heating the above resultant solution at a temperature in the range of 40–60° C. for a period of about 24 hours under nitrogen atmosphere to obtain an iron ion loaded cross linked polymer gel iv). soaking the above said polymer gel for a period ranging from 2 to 4 hours into sodium hydroxide solution of strength ranging between 0.00–0.009M, at a temperature ranging between 40–50° C.

v). washing the above soaked polymer gel with de-ionized water to remove the sodium chloride salt and recovering the nanosized iron oxide particles from the soaked polymer gel.

In one embodiment of the invention, the polyvinyl alcohol and disodium tetraborate solution are taken in a volumetric ratio ranging between 9:1 to 12:1

In another embodiment of the invention, the reaction mixture obtained in step (I) and the iron salt solution are taken in a volumetric ratio ranging from 2:1 to 5:1.

In an embodiment of the invention the iron salt solution used is a mixture of ferric chloride and ferrous chloride in de-ionized water.

DETAILED DESCRIPTION OF THE INVENTION

In nature, the synthesis of nano and micro sized inorganic particles is observed since the evaluation of life. The process is termed as bio-mineralization and it exhibits a high degree of control over the nucleation and growth of the synthesized particles, which perform different functions under different conditions and do not agglomerate. Our teeth, bones, shells, etc. are the products of biomineralization and nature carries out these in situ synthesis under the control of a biopolymeric matrix.

In the process of present invention in laboratory a method has been developed for in situ precipitation of nanosized magnetite particles in a pre-organized polymeric matrix made of a water-soluble polymer like polyvinyl alcohol at room temperature. The method produced magnetite particles in the size range of 5–10 nm having uniform morphology and orientation with supraparamagnetic behavior.

Under the optimum conditions of temperature, concentration, pH and a specific volumetric ratio, the underlying polymeric matrix provides a regularly arranged and uniformly distributed reaction as well as nucleation sites in the self assembled polymeric network formed as a result of gelation and cross-linking. The process involves a weak complexion (via dative bond formation) of ferrous/ferric ions (acceptor atom) with the active functional groups (donor atom) of the underlying polymer. An enhancement in the degree of saturation of ferrous/ferric ions locally at the complexion sites leads to the precipitation of nanosized magnetite particles under alkaline conditions at an optimum temperature. Adsorption of the polymer at the surface of the precipitate limits the dimensions of particles in nanometer size range and the polymer matrix anisotropy induces an orientation during the particle growth.

By the process of the present invention, a single phase agglomeration free magnetite particles in size range of 5–10 nanometer and oriented in form of linear arrays are produced.

The novelty of the present route is the in situ synthesis of the magnetite particles in preorganized polymer matrix. The polymer matrix controls the particles shape and size and regulates the precipitation process. The inventive step of the present invention is the chelation of ferrous ions by weak van der Wall bonds and hydrogen bonds present in crossliked polymer matrix. The cross linking of the polymer provides a biopolymer like medium for mineralization which is characterized by regular arrangement of nano reactors and avoids agglomeration of the particles and induce precipitation under mild conditions of super saturation.

The following examples are given by way of illustration and should not be construed to limit the scope of the present invention.

EXAMPLE 1

60 ml 0.5% polyvinyl alcophol was mixed with 15 ml of 0.013 M iron salt solution (prepared by dissolving ferric chloride and ferrous chloride salt in the deionized water in the ratio by weight of 3:2) in the volumetric ratio of 4:1 by continuous stirring using a magnetic stirrer. The pH of the solution was observed 3. The resulting solution was poured into a Petri dish and subjected to gel formation in an oven at 40° C. maintaining nitrogen atmosphere for 24 hours. The thin dried light yellow film (gel) was soaked for 4 hours in 0.00625 M sodium hydroxide solution taken in a beaker and heated to 40° C. following which color of the film changed from light yellow to black. Next, the black film was washed thoroughly by diionized water and again it was dried at 40° C. in the same oven maintaining nitrogen atmosphere for 24 hours. Finally, the washed and dried sample was structurally characterized using X-ray diffraction, scanning electron microscopy and transmission electron microsocopy. The analysis of the results obtained confirmed the formation of single phase magnetite particles in the form of oriented and regularly arranged linear arrays having a low particle density showing agglomeration to certain extent and size in the range of 10–40 nm. Recovery of the iron oxide was close to 100%.

EXAMPLE 2

60 ml of 0.5% polyvinyl alcohol solution was mixed with 6 ml of 0.5% disodium tetra borate solution in the volume ratio of 10:1 mixed by continuous stirring using a magnetic stirrer. Net, 15 ml of 0.013 M iron salt solution (prepared by dissolving ferric chloride and ferrous chloride salts in de-ionized in the ratio 3:2) was added in a volume ratio 4:1 by continuous stirring using a magnetic stirrer. The pH of the solution was observed to be 5. The resulting solution was poured into a Petri dish and was subjected to gel formation in an oven at 40° C. maintaining nitrogen atmosphere. The dried film was soaked in 0.00625M sodium hydroxide take in a beaker heated to 40° C., for 4 hours following which, color of the film changed from light yellow to black. Next, the film was washed thoroughly with de-ionized water and dried in an oven at 60° C. for 24 hours maintaining nitrogen atmosphere. The washed and dried sample was structurally characterized by X-ray diffraction, scanning electron microscopy and transmission electron microscopy. The analysis of the results obtained linear arrays widely distributed throughout the matrix network being parallel to each other. The particle size in the case was observed to be decreased to a range of 10–20 nm. More number of arrays with increased particle density and almost without any agglomeration was observed in this case. The recovery rate of iron oxide was close to 100%.

EXAMPLE 3

60 ml of 0.5% polyvinyl alcohol solution was mixed with 6 ml 0.5% disodium tetra borate solution with continuous stirring using magnetic stirrer at room temperature. The pH of the solution was observed to be 5. To this, 15 ml of iron salt solution (prepared by dissolving ferric chloride and ferrous chloride salt in deionized water in the ratio 3:2) was added, again with continuous stirring and the resulting solution was poured into a Petri dish and kept in an oven for gel formation at 40° C. under nitrogen atmosphere for 24 hours. Next, the dried light yellow gel was soaked for 4 hours in 0.00625 M sodium hydroxide solution taken in a beaker and heated to 40° C., following which color of the gel changes from light yellow to black. It was washed 4 to 5 times with de-ionized water and dried at 40° C. in an oven under nitrogen atmosphere. The washed and dried film was structurally characterized by X-ray diffraction, scanning electron microscopy and transmission electron microscopy.

The analysis of data indicated the presence of single phase magnetite in the form of linearly oriented arrays, arranged regularly, parallel to each other widely distributed throughout the matrix with high particle density in the matrix nucleation sites. The particle size in this case ranged from 5–10 nm, had a high aspect ratio and were with no agglomeration. The recovery rate of iron oxide was close to 100%.

The main advantages of the present inventions are:
1. The invention provides a room temperature process for the preparation of nanosized magnetite particles suitable for application in magnetic resonance image contrast enhancement.
2. The invention leads to agglomeration free magnetite particles with uniform shape and size.
3. The size distribution of the particles is very narrow.
4. The produced particles being super-paramagnetic in nature can be used in other applications also involving ferro fluids.

We claim:
1. A process for preparation of nanosized iron oxide by biomimetic route which comprises
   i). mixing polyvinyl alcohol of strength ranging between 0.1–0.6% and disodium tetraborate solution of strength ranging between 0.1–0.6% in deionised water with continuous stirring ii). mixing the above mixture with an iron salt solution of strength ranging between 0.01–0.02 M in deionised water under nitrogen atmosphere, at a pH in the range of 3–6 and stirring for about 20 minutes with a magnetic stirrer to form a resultant solution iii). heating the resultant solution at a temperature in the range of 40–60° C. for a period of about 24 hours under nitrogen atmosphere to obtain an iron ion loaded cross linked polymer gel iv). soaking said polymer gel for a period ranging from 2 to 4 hours into sodium hydroxide solution of strength ranging between 0.00–0.009M, at a temperature ranging between 40–50° C.

v). washing the soaked polymer gel with de-ionized water to remove sodium salt and recovering nanosized iron oxide particles from the soaked polymer gel.

2. A process as claimed in claim 1 wherein the polyvinyl alcohol and disodium tetraborate solution are taken in a volumetric ratio ranging between 9:1 to 12:1.

3. A process as claimed in claim 1 wherein the reaction mixture obtained in step (i) and the iron salt solution are taken in a volumetric ratio ranging from 2:1 to 5:1.

4. A process as claimed in claim 1 wherein the iron salt solution used is a mixture of ferric chloride and ferrous chloride in de-ionized water.

5. A process as claimed in claim 1 wherein the polymer gel is in the form of a polymer matrix and controls the size and shape of the iron oxide formation.

6. A process as claimed in claim 5 wherein the ferric and ferrous ions are chelated by weak van der Waals bonds and hydrogen bonds present in the polymer matrix.

* * * * *